Figure 6:
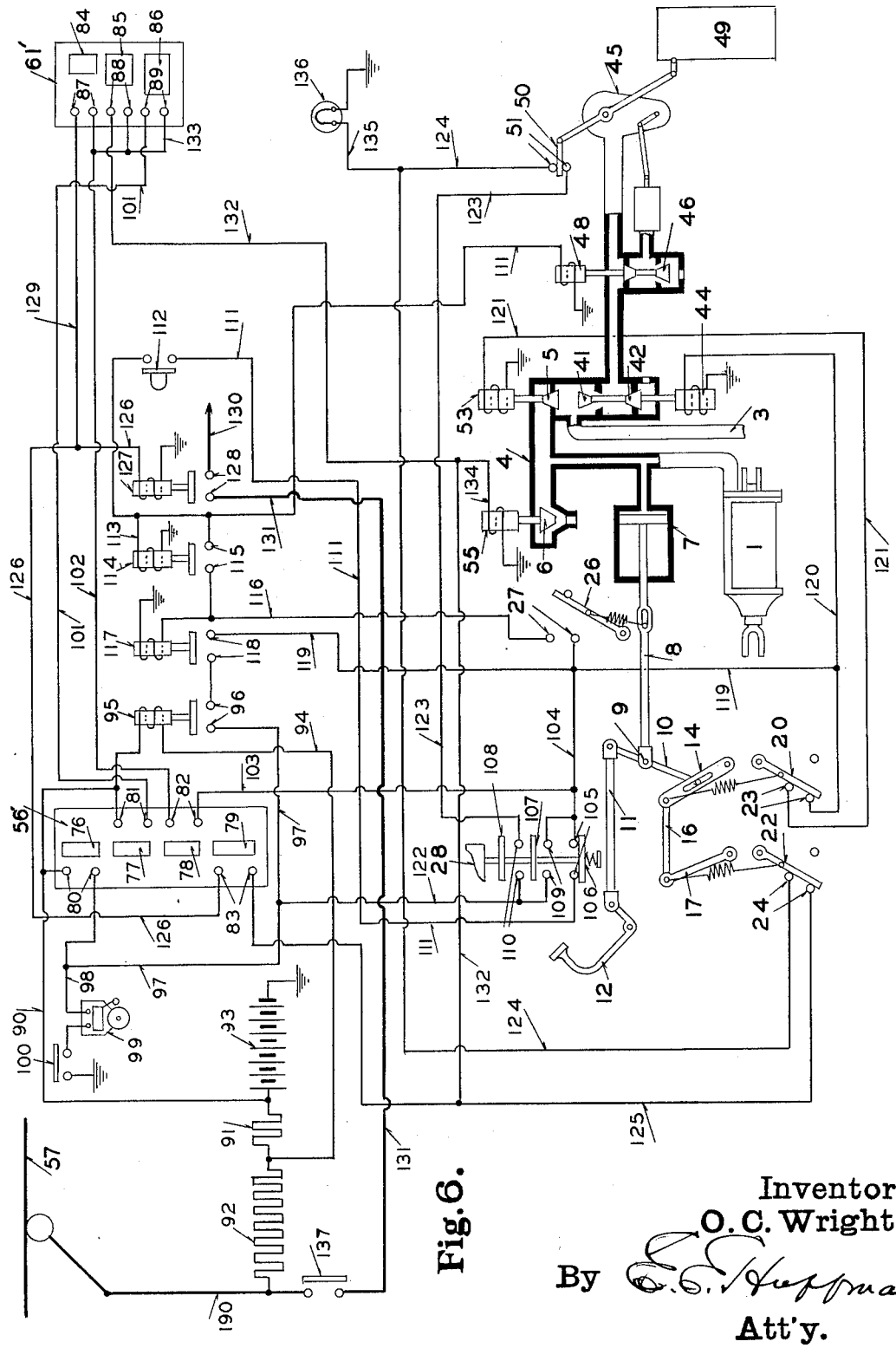

Feb. 27, 1934.                O. C. WRIGHT                 1,949,033
                          FLUID PRESSURE BRAKE
                          Filed May 9, 1931           4 Sheets-Sheet 1
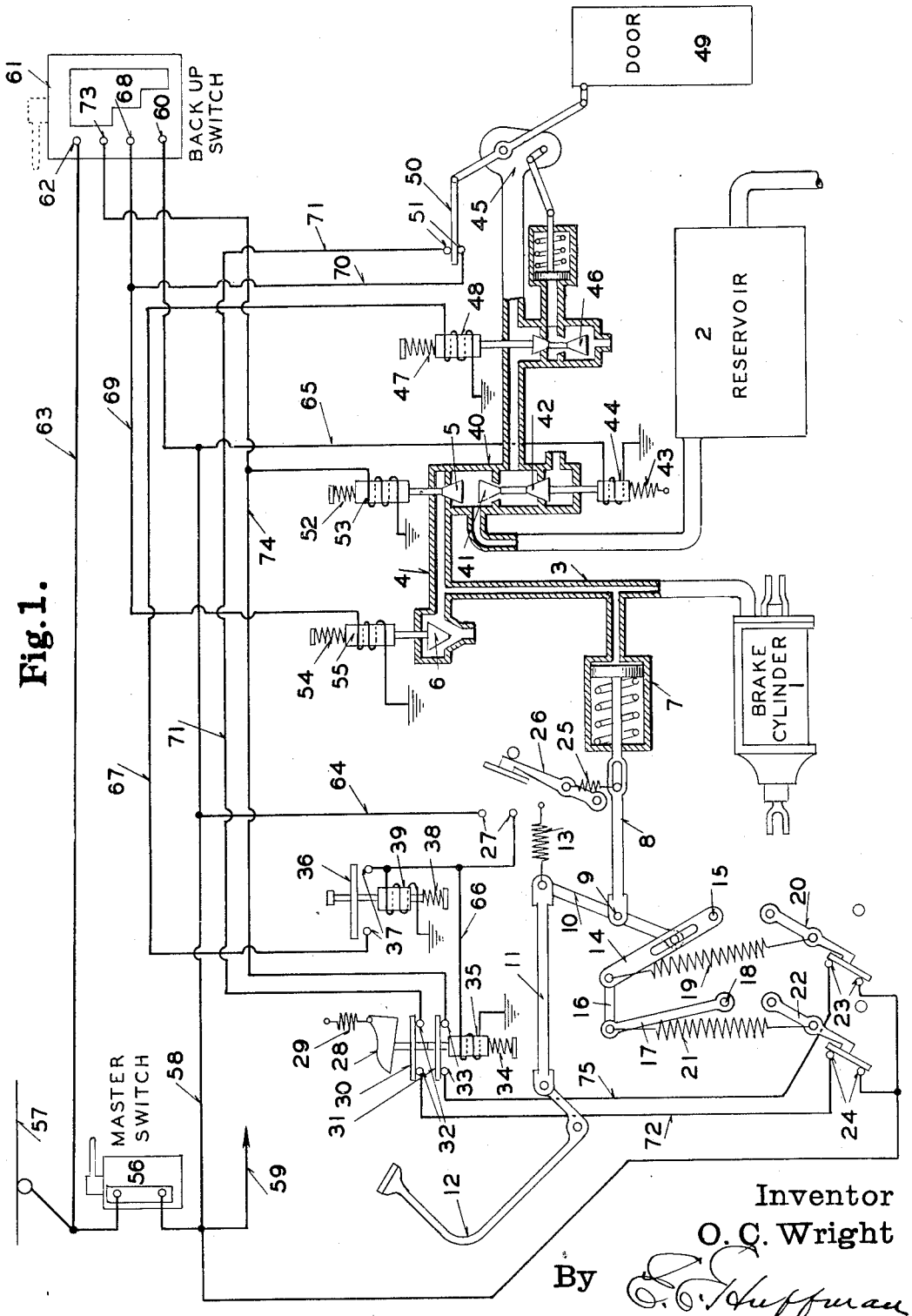
Inventor
O. C. Wright
By
E. C. Huffman
Att'y.

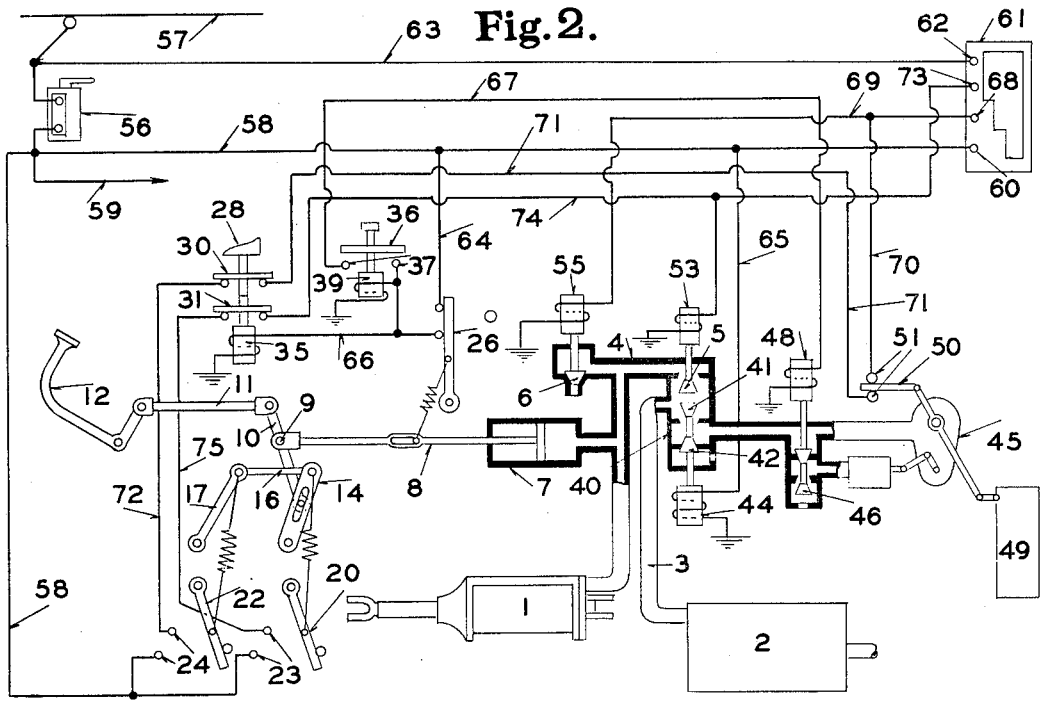

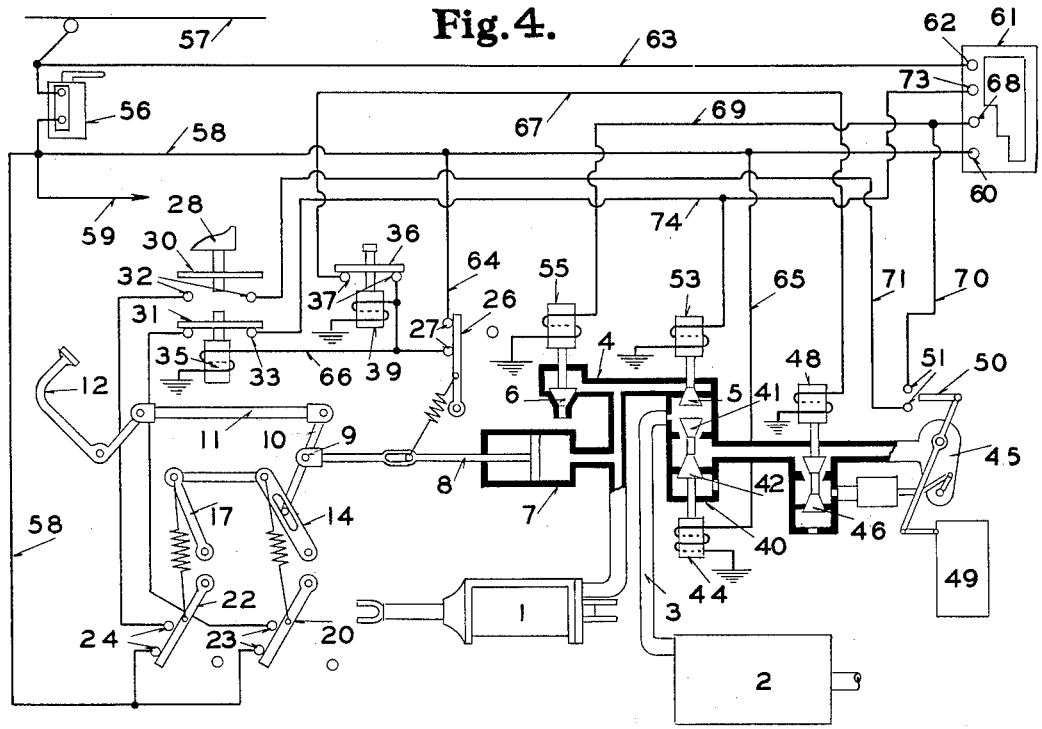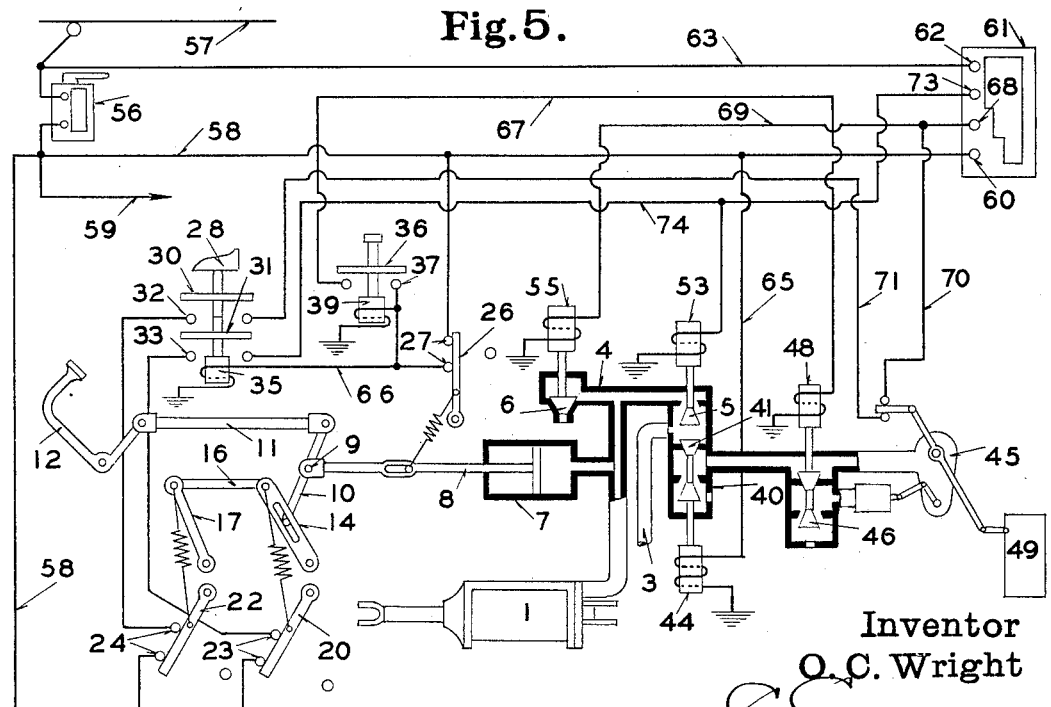

Patented Feb. 27, 1934

1,949,033

UNITED STATES PATENT OFFICE 1,949,033

FLUID PRESSURE BRAKE

Orville C. Wright, St. Louis, Mo.

Application May 9, 1931. Serial No. 536,104

14 Claims. (Cl. 303—20)

My invention relates to a fluid pressure brake system adapted for use on electrically operated vehicles, such as street cars, and relates particularly to improvements in the type of brake system shown, for example, in my pending application for patent Serial No. 426,469 filed February 7, 1930, in which the electrically operated brake valves are controlled through circuit making and breaking devices to automatically maintain the braking pressure at any desired amount as determined by the movement of a foot pedal or similar control device.

One object of my invention is to provide quick acting means for making and breaking the circuits controlling the valves so as to obtain greater speed and flexibility in the operation of the device.

Another object of my invention is to reduce the number of valves necessary for control of brake application, thus not only decreasing the cost of the device but further increasing the sensitiveness of control and reliability of operation.

Still another object of my invention is to combine the braking system with a door control so that the two systems are interdependent and thus adapting the device for use on cars of the type known as "one-man car" in which a single operator acts as both motorman and conductor.

A further object is to provide the device with a "back up" switch, that is with a circuit controlling device preferably situated in the rear of the car, for operating the car in reverse direction.

In the accompanying drawings, which illustrate one form of brake system made in accordance with my invention, Figure 1 is a semi-diagrammatic view showing the device in release position with door closed; Figure 2 is a diagram showing the device in service application position with door closed; Figure 3 is a diagram showing the device in service lap position with the door closed; Figure 4 is a diagram showing the device in stop lap position with the door open; Figure 5 is a diagram showing the device in emergency position with door balanced; and Figure 6 is a diagram showing a modification adapting my device for the inclusion of a low voltage supply.

Referring first to Figures 1 to 5, the brake cylinder 1 is supplied with compressed air from reservoir 2 through pipe 3 in which is interposed a valve casing 4. Contained in the valve casing 4 is an application valve 5 and a release valve 6. Valve 5 is normally held in open position by a compression spring 52 and is moved to closed position by an electromagnet 53. Valve 6 is normally held in closed position by a compression spring 54 and is moved to open position by an electromagnet 55. Communicating with the brake cylinder is a control cylinder 7 the piston of which acts against a compression spring. The piston rod 8 of this piston is pivoted at 9 to a differential lever 10 one end of which is pivoted to an operating rod 11 actuated by a pedal 12. Pedal 12 is normaly held in raised position by a tension spring 13 attached to the rod 11. The lower end of the lever 10 is slidingly and pivotally connected to an arm 14 pivoted at 15 and connected by link 16 with an arm 17 pivoted at 18. Arm 14 is connected by spring 19 to an arm 20 so that these two parts form a quick-acting toggle switch. Arm 17 is likewise connected by spring 21 to an arm 22 to form a second quick-acting toggle switch. The arms 14, 17, 20 and 22 are so related that when the switches are opened or closed by movement of lever 10 they will not operate simultaneously but will operate one after the other, as will be fully described in connection with the operation of the device. When switch arm 20 is closed it connects terminals 23, and arm 22 in closed position connects terminals 24. Piston rod 8 is connected by spring 25 with a lever 26 forming a quick-acting toggle switch which, when in closed position, connects contacts 27. Adjacent to the toe operated pedal 12, is a heel plate 28 which, when depressed against the action of tension spring 29, moves contact plates 30 and 31 to connect terminals 32 and 33, respectively. The two contact plates are capable of independent movement but plate 31 follows plate 30 due to the thrust of a compression spring 34, except when prevented by the action of an electromagnet 35. Within access of the motorman is a door switch 36 adapted to connect terminals 37. This switch normally stands open under the influence of a compression spring 38 and is closed manually. It may be retained in closed position by the action of holding magnet 39.

Carried by the valve casing 4 is an extension 40 in which are located the door interlock valves 41 and 42, the former being normally held closed, and the latter open, by a tension spring 43. An electromagnet 44 moves the valves against the spring to close valve 41 and open valve 42. Communicating with the space between valves 41 and 42 is a door engine 45 of any suitable type controlled by a valve mechanism 46 normally held in the position shown in Figure 1 by a compression spring 47 but adapted to be moved into the position shown in Figure 4 by the action of an electromagnet 48. The engine operates a door 49 and also moves a sliding contact 50 which connects terminals 51 when the door is in closed position.

The master switch 56, when closed, connects the trolley 57 with a conductor 58 and to a line wire 59 leading to the usual line breaker (not shown). Conductor 58 is connected at one end to one of the terminals 23 and one of the terminals 24, and at the other end to the lower terminal 60 of the backup switch 61, the upper terminal 62 of which is connected to a conductor 63 leading to the side of the master switch 56 opposite the conductor 58. Conductor 58 is also connected by branch 64 with one of the terminals 27, and by branch 65 through electromagnet 44 to ground. From the other terminal 27 a line 66 leads through electromagnets 34 and 39 to ground, and to one of the terminals 37, the other being grounded by line 67 including electromagnet 48. Leading from an intermediate terminal 68 of switch 61 is a grounded line 69 including electromagnet 55, and provided with branch 70 leading to one of the terminals 51, the other being connected by line 71 with one of the terminals 32. The other terminal 32 is connected by line 72 with one of the terminals 24. The other intermediate terminal 73 of switch 61 is connected to grounded line 74 through electromagnet 53 and to one of the terminals 33, the other terminal 33 being connected by line 75 with one of the terminals 23.

The operation of my brake system is as follows: In release position (Figure 1) heel plate 28 is held down bridging terminals 32 and also terminals 33, and pedal 12 is released allowing spring 13 to move rod 11 to its extreme right hand position. This moves lever 10 on its pivot 9 causing switch arms 20 and 22 to bridge terminals 23 and 24, respectively. Current from trolley 57 now passes through master switch line 58, switch arm 22, line 72, contact plate 30, line 71, sliding contact 50, and lines 70 and 69 to magnet 55 and thence to ground; and from line 58 through switch arm 20, line 75, contact plate 31, and line 74 to magnet 53 and thence to ground; also from line 58 through line 65 to magnet 44 and thence to ground. Energizing magnet 53 closes valve 5 cutting off air supply from reservoir to brake cylinder, while magnet 55 opens valve 6 venting brake cylinder. Energizing magnet 44 holds valve 41 open and valve 42 closed, thus supplying air to door engine 45. As there is no pressure in the brake cylinder the piston of the control cylinder 7 will be moved to its extreme right hand position opening switch 26.

The position of the parts in service application is shown in Figure 2. In this position the heel plate 28 remains depressed and toe pedal 12 is also depressed drawing rod 11 forward and so swinging lever 10 on its fulcrum 9 a sufficient distance to open quick-acting switches 20 and 22, breaking the circuits between contacts 23 and 24. Opening these circuits deenergizes magnets 53 and 55 causing valve 5 to open and valve 6 to close. This admits air to the brake cylinder, applying brakes, and also to control cylinder 7 moving its piston rod forward and so closing quick-acting switch 26. Switch arm 26 may be so located with reference to its attachment to the piston rod 8 that it will close at any predetermined brake pressure. In practice I find a pressure of about 30 pounds per square inch to be suitable. When the switch arm bridges contacts 27 magnets 35 and 39 are energized. Both these magnets are holding magnets. That is, their coils are so related to their armatures that they will not draw their armatures down but will, when energized, hold them in depressed position.

When the brake pressure has reached a certain amount, determined by the amount of depression of pedal 12, switch arm 20 will be closed, as shown in Figure 3, bridging contacts 23 and closing the circuit through magnet 53 and so moving valve 5 to closed position and preventing further rise of pressure in the brake cylinder. Should air leak from the brake, piston rod 8 will be retracted, moving the switch arm to the position shown in Figure 2, admitting more air to the cylinder. Constant pressure is thus maintained in the brake cylinder proportional to the depression of the lever 12. The motorman may allow the heel plate 28 to rise when the parts are in this position without affecting the operation of the device as the circuit through line 72 is already broken at contacts 24 and contact plate 31 is held down by magnet 35. Further application of the brake may be secured by greater depression of pedal 12 causing valve 5 to be opened, as in Figure 2, until the desired increase in brake pressure is reached, when the parts will automatically resume the position shown in Figure 3. Also, brake pressure may be reduced by allowing pedal 12 to rise, which will cause the parts to assume the position shown in Figure 1, except that switch arm 26 remains in closed position, as shown in Figure 2, and will remain closed until the brake pressure has reached a predetermined minimum of, for example, 5 pounds.

The motorman, having made an initial brake application of 30 pounds or more, may bring the car to a stop under any pressure not less than 5 pounds. He may now depress the door switch 36, closing the circuit through magnet 48 and so reversing the door motor control valve 46. The door may now be opened by any suitable means as, for example, the usual method of stepping on a treadle step (not shown) connected with the door motor. When the door is open sliding contact 50 is withdrawn from terminals 51, breaking the circuit through wires 70 and 69 to magnet 55, so that until the door is closed it is impossible to open valve 6 and release the brake pressure. This "stop lap" position is shown in Figure 4. If, however, the door is closed, depression of the heel plate 28 closes the circuit through magnet 55, releasing brake pressure and restoring the parts to the position shown in Figure 1 ready for application of power to the motor.

When it is desired to make an emergency application the master switch is thrown to "off" position, as shown in Figure 5. This cuts off power from the trolley so that all the magnets are deenergized, thus opening valve 5 to admit pressure to the brake cylinder and closing release valve 6 so that regardless of the position of pedal 12 and heel plate 28, full braking pressure will be applied. At the same time interlock valves 41 and 42 will have their positions reversed so that pressure will be cut off from the door engine and control valve 46, also reversed, thus leaving the door balanced so that it may be opened or closed manually.

Running the car backward is accomplished by means of the "back-up" switch 61 positioned at the other end of the car. To prevent unauthorized use of either the master or "back-up" switch the same handle is used for both, being detached from the master switch and applied to the "backup" switch, as shown in dotted lines in Figure 1, when it is desired to operate the car through the medium of the latter switch. The operating handle of the master switch can only be removed when the switch is in deenergizing position and can only be applied to the "back-up" switch when this switch is in the open or "brake applied" position. Further, some means, as for example a spring, should be provided to automatically return the "back-up" switch to open position when the handle is released. This switch has three positions in addition to the "off" position in which it remains while the car is operated from the master switch and in which it is shown in the drawings. This position secures emergency application of the brakes, as shown in Figure 5, for, as will be understood, the master switch is left in "off" position when the "back-up" switch is used.

Lap position is secured by moving switch to position to connect terminals 62 and 73. The energizing of magnet 53 cuts off the air supply from the brake cylinder but retains pressure therein as valve 6 remains closed. Further movement of switch 61 connects terminals 62 and 73 to terminal 68, opening valve 6 and so releasing the air from the brake cylinder. Still further movement of switch 61 connects terminal 60 with terminals 62, 73 and 68, thus supplying power to line 58 and consequently through line 59 which acts to supply power to the motor to run the car. At the same time current will pass through branch line 65 to magnet 44 moving valves 41 and 42 to the position shown in Figure 1, holding the door in closed instead of balanced position.

In Figure 6 I have shown a modification in which a low voltage source of current supply is introduced into the system. In this modification the brake cylinder and door engine with their valves, as well as the quick-acting switches, are the same as in the form heretofore described. The circuits, however, as well as the controls, including master and "back-up" switches, are necessarily modified to accommodate the use of the secondary current supply, and the valve actuating magnets are wound for low voltage instead of line voltage.

Master switch 56' is provided with four contact closing plates 76, 77, 78 and 79 adapted to connect terminals 80, 81, 82 and 83 respectively. "Back-up" switch 61' is provided with three contact closing plates 84, 85 and 86 adapted to connect terminals 87, 88 and 89, respectively. One of the contacts 80 is connected by lines 90 and 190 with the trolley wire 57, resistors 91 and 92 being interposed between said lines 90 and 190, the combined resistance of which is sufficient to reduce the line voltage to the proper amount to charge battery 93 which is connected to line and to ground. Line 90 is also connected to line 94 leading from one of the contacts 81 through relay 95 to a point between the resistors 91 and 92. The relay 95 is adapted to bridge contacts 96. Resistances 91 and 92 are of such value that when the normal trolley voltage is impressed upon them in series, resistance 91 having the coil of relay 95 in parallel with it, the necessary amount of current will flow through the battery 93 to ground to keep the battery properly charged. The value of the resistance 91 is such that the drop in potential across it is the same as the voltage for which the coil of relay 95 is wound. The relay will, therefore, open the circuit between contacts 96 in case the trolley voltage is interrupted in order to prevent exhaustion of the battery in case the car is left with the trolley off and the brakes in service lap position. One of these contacts 96 is connected by line 97 with the remaining contact 80. Leading from the line 97 is a grounded line 98, including a bell 99 and ringing button 100. The second contact 81 is connected by line 101 with one of the contacts 89 of switch 61'. One of the contacts 82 is connected by line 102 with one of the contacts 87. The other contact 82 is connected by line 103 extending from one of the contacts 27 to one of a pair of contacts 105. These contacts 105 are adapted to be bridged by a contact plate 106 carried by the heel plate 28. The heel plate also carries two other contact plates 107 and 108 adapted to bridge pairs of contacts 109 and 110, respectively. This switch is so arranged that when the heel plate is in raised position, as shown in Figure 6, plate 106 will bridge contacts 105 while the circuits between the pairs of contacts 109 and 110 will be broken. When the heel plate is depressed, this condition will be reversed, the circuit between contacts 105 being broken and those between the contacts 109 and 110 closed. The second contact 105 is connected by grounded line 111, containing door control button 112, with magnet 48 for operating the door control valve 46. Connected with line 111 is a grounded branch 113, including a relay 114, adapted to bridge contacts 115, one of which is connected by the line 111 and the other to a line 116 connected at one end to one of the contacts 27 and grounded at the other after passing through a relay 117 adapted to bridge contacts 118. One of the contacts 118 is connected to one of the contacts 96 and the other through line 119 with a line 120 connected at one end to one of the contacts 23 and the other to ground after passing through magnet 44. The other contact 23 is connected to line 121 passing through magnet 53 and thence to ground. One of the contacts 109 and one of the contacts 110 are connected by line 122 with line 97. The other contact 109 is connected to line 104 and the other contact 110 is connected by a line 123 with one of the door contacts 51. The other contact 51 is connected by line 124 with one of the switch contacts 24, the other contact being connected by line 125 with one of the contacts 83. The other contact 83 is connected to line 126 leading to ground through a relay 127 adapted to bridge contacts 128. Line 126 is connected by branch 129 with one of the contacts 87. One of the contacts 128 is connected by line 130 to line breaker (not shown) and thence to the motor. The other contact 128 is connected by line 131 with the line 190 at a point between the trolley and resistance 92. In line 131 is a switch 137 for manually opening or closing it. One of the contacts 88 is connected by line 132 with line 125 and the other by line 133 with one of the contacts 89 and with line 102. From line 132 a branch 134 leads through magnet 55 to ground. Leading from line 124 to ground is a line 135 containing a signal light 136 to indicate the position of the door.

The operation of the modified form of brake control is as follows: For forward operation the master switch is moved to the position in which plate 76 bridges contacts 80 and plate 79 bridges contacts 83. Heel plate 28 is depressed, thus establishing circuit from the trolley 57 through line 90, including resistors 91 and 92, contact plate 76, lines 98, 97 and 122 to one of the contacts 110 and contacts 110 being bridged by plate 108 through line 123 to one of the door contacts 51. The door being closed, current will flow through lines 124 and 135 to ground the lighting signal lamp 136 to indicate the proper position of the door. Current also flows through line 124, switch arm 22, line 125, line 132, and line 134 to ground, energizing magnet 55 and opening valve 6. Current also flows through contacts 109, which are bridged by plate 107, lines 104, 119 and 120 to one of the contacts 23. Switch arm 20, being in closed position, bridges contacts 23 so that current flows through line 121, including magnet 53 to ground, closing valve 5. Valve 5 being closed and valve 6 open, the brake is held in released position. A circuit is also established from line 125 through contact plate 79 of switch 56' and line 126 to ground through relay 127, causing it to bridge contacts 128 so that current may be supplied to the motor through lines 190, 131 and 130 by closing the switch 137 in line 131. Current also flows from line 122 through plate 107, bridging contacts 109, lines 104, 119 and 120 through magnet 44 to ground, thus moving valves 41 and 42 to position to maintain reservoir pressure on the door engine.

To make a service application pedal 12 is depressed, swinging lever 10 on its pivot 9 and opening switches 20 and 22. Opening these switches breaks the circuits through magnets 53 and 55, opening valve 5 and closing valve 6, thus admitting air to the brake cylinder and moving piston rod 8, through the movement of which the brake application is maintained at the desired amount in the manner heretofore described. When making a stop the brake is applied with an initial pressure of 30 pounds or more and may be reduced in the normal process of bringing the car to a stop, to a final pressure of not less than 5 pounds. This will cause switch arm 26 to remain closed, energizing relay 117, bridging contacts 118. Relay 95 is also closed, bridging contacts 96 (provided the trolley circuit is not interrupted) so that line 119 is brought into contact with the current supply, establishing a circuit through valve 53 independently of that originally established by depressing plate 28. The operator may now remove pressure from the heel plate, allowing the switch to rise, breaking the circuit through magnet 55, and allowing valve 6 to close and retain in the brake cylinder the amount of pressure at which final application was made. As switch 28 is now in open position the motorman may energize relay 114 by operating push button 112. This bridges contacts 115, establishing a circuit from lower contact 80 through line 97 to bridge contacts 96 and 118, line 119, switch 26, line 116, bridged contact 115, line 111, and line 113 through relay 114 to ground. The push button may now be released, breaking the circuit through line 111. Relay 114 will, however, remain energized and consequently magnet 48 will maintain valves 46 in position for opening the door. With the opening of the door circuit 124 is interrupted so that the signal lamp 136 ceases to burn and also renders the closing of switch arm 22 inoperative to energize magnet 55 and hence the motorman cannot release the brake, by depression of switch 28, while the door is open. When the motorman is ready to start the car he releases heel switch 28. If the signal light burns the brake may be released by allowing the pedal 12 to rise or the brake will be automatically released when the door is closed if pedal 12 is previously allowed to rise. In case the trolley current supply is interrupted, the door operation, as described above, is impossible because relay 95 will be de-energized, thus opening the circuit between contacts 96. Under this condition if the motorman attempts to open the door the release of the heel plate 28, preliminary to the operation, will break the circuit between terminals 109 and 110 de-energizing magnet 44 and bringing the door to balanced position as in any emergency application.

The bell 99 and operating button 100 have no effect on the operation of the brake but are illustrated to show how the bell signal system may be operated from the battery 93 without the use of a separate low voltage supply.

When it is desired to operate the car in reverse direction switch 56' is moved into reverse position so that contact plate 77 bridges contacts 81 and plate 78 bridges contacts 82. Switch 28 is thus allowed to rise, opening the circuits between contacts 109 and also that between contacts 110. Relay 95 remains energized and since the contacts 83 are unconnected, relay 127 is de-energized so that no current can pass to the motor.

The motorman now sets the usual controller (not shown) in reverse position and on the selected notch. Switch 61' is now moved to its first position so that contacts 89 are connected by plate 86, establishing the following circuit; from trolley through line 190, including resistances 91 and 92, to one of the contacts 81, from the other contact 81 through line 101 to one of the contacts 89, from the other contact 89 through lines 133 and 102 to one of the contacts 82, from the other contact 82, through lines 103, 104, 119, 120, switch 20 and line 121 to ground through magnet 53, cutting off pressure from the brake cylinder and placing the brake in lap position.

To place the brake in release position switch 61' is moved to the next position, connecting contacts 88 through plate 85. This establishes a supply circuit from the trolley or battery through line 90, plate 77, line 101, plate 86, line 133, plate 85, line 132, and line 134 through magnet 55 to ground, opening valve 6 and releasing the brake pressure. To place the car in running position switch 61' is moved still further, connecting terminals 87 through plate 84. This places line 133, which is in communication with the supply, in circuit with lines 129 and 126 through relay 127 to ground. This bridges contacts 128 and places the motor in circuit line supply.

The principal advantage of the form of brake system shown in Figure 6 over that shown in Figures 1 to 5 is that the brake is not necessarily thrown into emergency application when the trolley current is interrupted from any cause, but may be controlled in the usual manner from the battery supply. Another advantage is that the wiring for low voltage is much more easily insulated than when line voltage is used. And further, such devices as signal bells may be applied without the necessity of separate power supply.

While I have shown the battery connected to the line supply through resistances so that it will be automatically charged therefrom, a battery independently of the line supply may be used.

Having fully described my invention, what I claim as new and desire to secure by Letters Patent of the United States is:

1. In a device of the class described, the combination with a brake cylinder and fluid pressure supply therefor, of electrically-operated supply and release valves therefor, a member movable proportionally to the brake cylinder pressure, a floating lever having its pivot point carried by said member, a manually-operated control connected with said lever, and a toggle switch included in a valve operating circuit, said toggle switch being connected with the floating lever, whereby said toggle switch is operated by the combining action of said member and control.

2. In a device of the class described, the combination with a brake cylinder and fluid pressure supply therefor, of electrically-operated supply and release valves therefor, a member movable proportionally to the brake cylinder pressure, a floating lever having its pivot point carried by said member, a manually-operated control connected with said lever, and a pair of quick acting switches arranged to operate in succession, said switches being connected with the floating lever, whereby this operation is the result of the combined action of said member and control.

3. In a device of the class described, the combination with a brake cylinder and fluid pressure supply therefor, of electrically-operated supply and release valves therefor, a member movable proportionally to the brake cylinder pressure, a floating lever having its pivot point carried by said member, a manually-operated control connected with said lever, a pair of quick acting switches arranged to operate in succession, said switches being connected with the floating lever, whereby this operation is the result of the combined action of said member and control, and a third quick acting switch actuated by the movement of said member alone.

4. In a device of the class described, the combination with a brake cylinder and fluid pressure supply therefor, of an electrically operated supply valve for said brake cylinder, a supply valve circuit, an electrically operated release valve for the brake cylinder, a release valve circuit, means including a manually operated control for making and breaking said circuits, and a second manually operated means for making and breaking said circuits independently of said first named means, said second named means comprising two parts movable in unison to close the circuits but movable independently to open the circuits.

5. In a device of the class described, the combination with a brake cylinder and fluid pressure supply therefor, of an electrically operated supply valve for said brake cylinder, a supply valve circuit, an electrically operated release valve for the brake cylinder, a release valve circuit, means including a manually operated control for making and breaking said circuits, a second manually operated means for making and breaking said circuits independently of said first named means, said second named means comprising two parts movable in unison to close the circuits but movable independently to open the circuits, and a holding magnet for one of said parts.

6. In a device of the class described, the combination with a brake cylinder and fluid pressure supply therefor, of an electrically operated supply valve for said brake cylinder, a supply valve circuit, an electrically operated release valve for the brake cylinder, a release valve circuit, means including a manually operated control for making and breaking said circuits, a second manually operated means for making and breaking said circuits independently of said first named means, said second named means comprising two parts movable in unison to close the circuits but movable independently to open the circuits, a holding magnet for one of said parts, a circuit for said holding magnet, a member movable proportionally to the brake cylinder pressure, and a switch operated by said member for making and breaking the holding magnet circuit.

7. In a device of the class described, the combination with a brake cylinder and fluid pressure supply therefor, of an electrically operated supply valve for said brake cylinder, a supply valve circuit, an electrically operated release valve for the brake cylinder, a release valve circuit, means including a manually operated control for making and breaking said circuits, a second manually operated means for making and breaking said circuits independently of said first named means, said second named means comprising two parts movable in unison to close the circuits but movable independently to open the circuits, a holding magnet for one of said parts, a circuit for said holding magnet, a member movable proportionally to the brake cylinder pressure, and a switch operated by said member for making and breaking the holding magnet circuit, said switch being arranged to close at a predetermined brake pressure and to open at a lower brake pressure.

8. In a device of the class described, the combination with a brake cylinder and fluid pressure supply therefor, of an electrically operated supply valve for said brake cylinder, a supply valve circuit, an electrically operated release valve for the brake cylinder, a release valve circuit, a device including a manually operated part for opening and closing said supply and release valve circuits, a second manually operated device including two independently movable parts for opening and closing said circuits, a holding magnet for retaining one of said parts in position to close its circuit, a door motor, an electrically operated reversing valve for said motor, a reversing valve circuit, a third manually operated member for opening and closing said reversing valve circuit, a holding magnet for said third named member, a member movable proportionally to the brake pressure, and a switch operated from said latter named member for controlling both holding magnet circuits.

9. In a device of the class described, the combination with a brake cylinder and fluid pressure supply therefor, of an electrically operated supply valve for said brake cylinder, a supply valve circuit, an electrically operated release valve for the brake cylinder, a release valve circuit, a device including a manually operated part for opening and closing said supply and release valve circuits, a second manually operated device including two independently movable parts for opening and closing said circuits, a holding magnet for retaining one of said parts in position to close its circuit, a door motor, an electrically operated reversing valve for said motor, a reversing valve circuit, a third manually operated member for opening and closing said reversing valve circuit, a holding magnet for said third named member, a member movable proportionally to the brake pressure, and a switch operated from said latter named member for controlling both holding magnet circuits, said switch being arranged to close at a predetermined brake pressure and to open at a lower brake pressure.

10. In a device of the class described, the combination with a brake cylinder and fluid pressure supply therefor, an electrically operated supply valve for said brake cylinder, a supply valve circuit, a release valve for said brake cylinder, a release valve circuit, a door motor, an electrically operated supply valve for said motor, a supply valve circuit, a master switch, manually operated devices for controlling said circuits when the master switch is closed, and a back-up switch for controlling said circuits when the master switch is open, said door motor supply valve being so connected in circuit with the back-up switch that it is maintained in closed position when said switch is in off position.

11. In a device of the class described, the combination with a brake cylinder and fluid pressure supply therefor, of electrically operated valves therefor, control circuits for said valves receiving supply from the trolley through a resistance, a battery in series with said resistance and adapted to be charged by trolley current flowing therethrough, and a relay in parallel with a portion of said resistance, said relay acting to supply battery current to the control circuits upon failure of the trolley current.

12. In a device of the class described, the combination with a brake cylinder and fluid pressure supply therefor, of electrically operated valves therefor, control circuits for said valves receiving supply from the trolley through a resistance, a secondary supply for said control circuits operative when the trolley circuit is interrupted, means including a master switch for governing said circuits, and a "back-up" switch operative for governing said control circuits when said master switch is in a predetermined position.

13. In a device of the class described, the combination with a brake cylinder and fluid pressure supply therefor, of electrically operated supply and release valves for said brake cylinder, a line current supply wire, an interrupter therefor, a low voltage control system for operating said valves and said interrupter, a battery for said control system, a door motor, and electrically operated means for controlling motive power to said door motor, said electrically operated means being in circuit with the interrupter.

14. In a device of the class described, the combination with a brake cylinder and fluid pressure supply therefor, of electrically operated valves for said brake cylinder, a line current supply wire, a low voltage control system for operating said valves including a resistance, a master switch and an interrupter in series connection with the line, a circuit in parallel with the low voltage system for operating said interrupter, and a battery for said control system connected to said line through the resistance.

ORVILLE C. WRIGHT.